United States Patent

Pontarella

[11] Patent Number: 4,488,463
[45] Date of Patent: Dec. 18, 1984

[54] METHOD AND APPARATUS FOR ARMATURE STRIPPING

[75] Inventor: Armand Pontarella, Rochester, N.Y.

[73] Assignee: Turner Bellows, Inc., Rochester, N.Y.

[21] Appl. No.: 475,333

[22] Filed: Mar. 14, 1983

[51] Int. Cl.³ ............................................. B26D 3/16
[52] U.S. Cl. ......................................... 83/13; 83/409.1; 83/425; 83/924; 82/101; 82/102; 82/47
[58] Field of Search .................. 83/13, 412, 415, 924, 83/409, 409.1, 425, 733, 435.1, 649; 29/564.3, 33.1, 27 B, 598, 403.1, 426.4; 82/46, 47, 84, 90, 101, 102, 97, 83

[56] References Cited

U.S. PATENT DOCUMENTS

| | | | |
|---|---|---|---|
| 2,685,730 | 8/1954 | Probst | 29/564.3 |
| 3,507,035 | 4/1970 | Mann | 82/101 |
| 4,111,084 | 9/1978 | Matsumoto | 82/102 |
| 4,366,618 | 1/1983 | Lakes | 29/33.1 |

Primary Examiner—James M. Meister
Assistant Examiner—John L. Knoble
Attorney, Agent, or Firm—Genea, Samuel R.

[57] ABSTRACT

A method and apparatus for armature stripping of wire from an electric motor armature having a shaft, a core including slots for winding wire therein and a commutator to effectively, efficiently and inexpensively salvage and recycle the armature is disclosed. The method includes the step of rotating the armature on its shaft on a carrier while simultaneously cutting the wound wire between the commutator and core a given depth with a rotating circular saw so that the combined steps of rotating the armature and cutting with a circular saw cuts all wires of the armature so that the wire may be easily removed from one end of the armature. The apparatus features a frame, a rotating circular saw and a guided carrier for loading and unloading a plurality of armatures on the carrier in a side-by-side relationship and rotatable thereon. The carrier is manually guided across the rotating circular saw so that the circular saw cuts the wound wire between the core and commutator a given depth. The apparatus also features a drive wheel coacting with the armature for rotating the armature simultaneously with the cutting of the armature wire so that all the armature wires are cut by the simultaneous cutting action of the saw and the rotation of the armature.

4 Claims, 7 Drawing Figures

METHOD AND APPARATUS FOR ARMATURE STRIPPING

BACKGROUND OF THE INVENTION

1. Field of the Invention

The present invention relates to an electric motor and more particularly to a method and apparatus for stripping an electric motor armature in an efficient, effective and inexpensive manner to salvage and recycle the armature.

Direct current electric motors have become very popular over the years particularly in the automotive field where many different electric motors are employed in an automobile to provide many conveniences such as window lifts, seat actuators, door locks, heater motors and radiator fans. In fact, the number of electric motors utilized in each new automobile necessitated an automation in the production of these electric motors. With high production of electric motors in the millions, the rejection of a small fractional part or percentage because of manufacturing defects such as shorts, open circuits and other electrical defects, results in a large number of armature rejects. The number of rejected armatures is significantly high and therefore very costly to merely discard the rejected armatures as waste.

2. Prior Art

In the past, in the salvaging of an armature, steps were taken to chuck the armature in a lathe and to use a single edge cutting tool to cut the windings from the armature. This method also produced a number of further rejects than cannot be tolerated, for example, the armature shaft may be bent by the cutting action of the single edge cutting tool. Other methods and apparatus for stripping armatures are described in U.S. Pat. Nos. 4,218,818 and 1,608,350. However, these methods, while satisfactory for their intended purpose, cannot meet the demands for mass recycling and salvaging of armatures as required in the automotive industry.

None of the aforesaid prior art attempts and no other means are known to the applicants to utilize high production tenchique in the salvaging and recycling of armatures.

SUMMARY OF THE INVENTION

Briefly described, a method and apparatus for stripping wire of an electric motor armature in accordance with the invention contemplates the cutting of the armature wire between the cummutator and core a given depth with a rotating circular saw without cutting the armature shaft and simultaneously rotating the armature about its shaft to circumferentially cut all of the wire about the shaft the aforesaid depth of the armature. A carrier is featured to transport sequentially a plurality of armatures across the rotating circular saw for cutting the armature wire at the aforesaid depth while a rotating drive wheel coacts with each armature core to rotate the armature simultaneously with the cutting of the armature wire with rotating circular saw.

A guiding means guides the carrier and secures the plurality of armatures to the carrier in a manner so that each armature is free to rotate during the cutting of the armature wire by the circular saw. The drive wheel coacting with the core of the armature rotates the armature counter to the rotation of the rotating circular saw and provides sufficient torque to permit the cutting by the circular saw.

It is an object of the present invention to provide an improved method and apparatus for stripping wire from an electric motor armature in an efficient, quick and inexpensive manner.

It is still another object of the present invention to utilize a rotating circular saw to cut armature wire windings with a rotating circular saw and utilize a drive wheel to rotate the armature in a counter-rotational direction to the rotating circular saw to cut all of the windings of the armature at a depth set by the circular saw and carrier and thus circumferentially cut the wire windings of the armature.

BRIEF DESCRIPTION OF THE DRAWINGS

The invention will be better understood upon consideration of the following detailed description taken together with the accompanying drawings in which are like elements in various figures having like designations and in which.

DESCRIPTION OF THE PREFERRED EMBODIMENT

Figure 1:
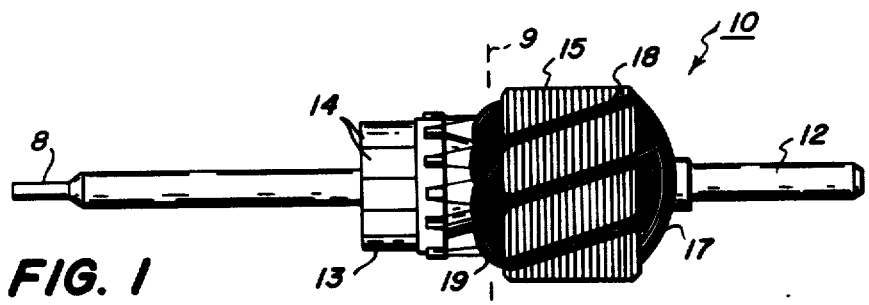
FIG. 1 is a side view of an electric motor armature having a cylindrical commutator and skewed lamination core typical of an armature to be stripped in accordance with the invention.

The method and apparatus of the present invention will be described with particular reference to the preferred embodiment illustrated in the drawing. It should be understood that drawing illustrations and description are to be taken only as illustrative of the preferred embodiment for the method and apparatus of the present invention and are to be understood in a general way and not in a restrictive way.

Figure 2:
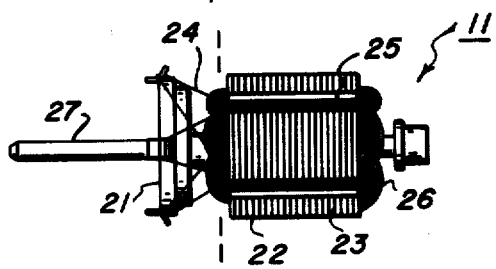
FIG. 2 is a side view of another electric motor armature having a flat disk type commutator and a straight lamination core which also may be stripped in accordance with the invention.
Figure 3:
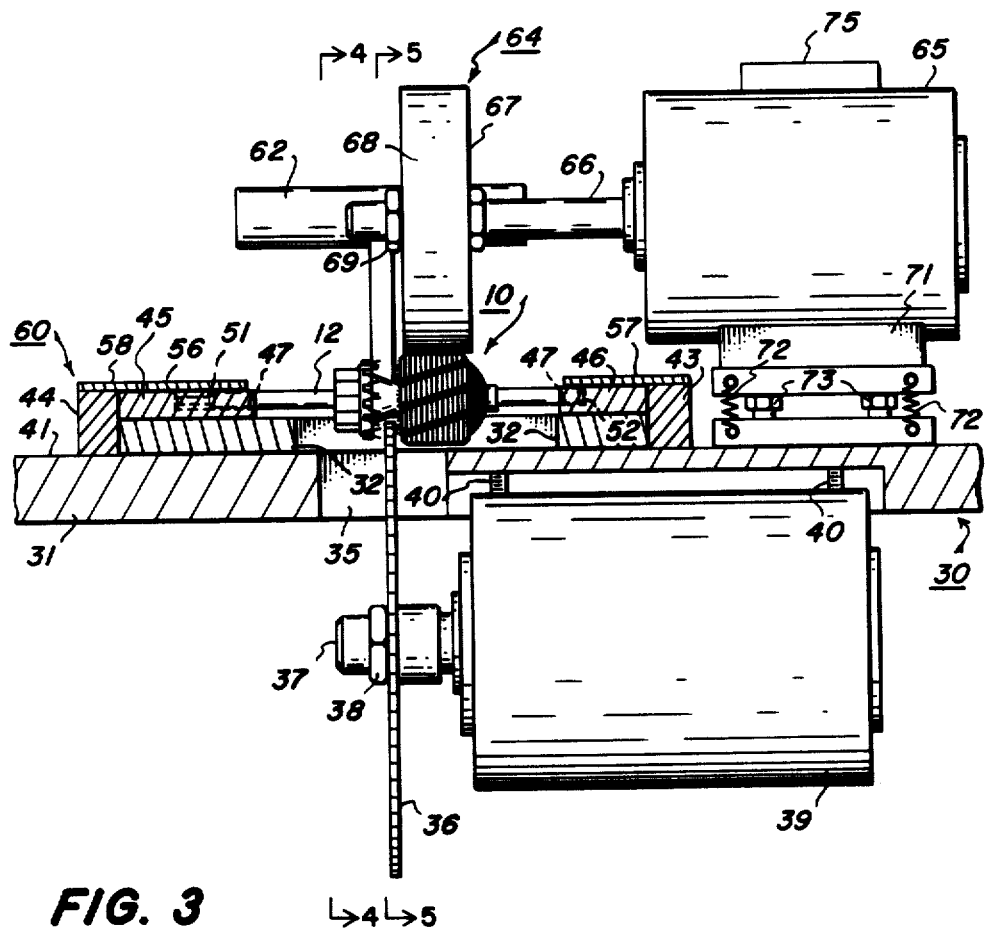
FIG. 3 is a partial cross-sectional view of the apparatus in accordance with a preferred embodiment of the invention taken along lines 3—3 of FIG. 5.
Figure 4:
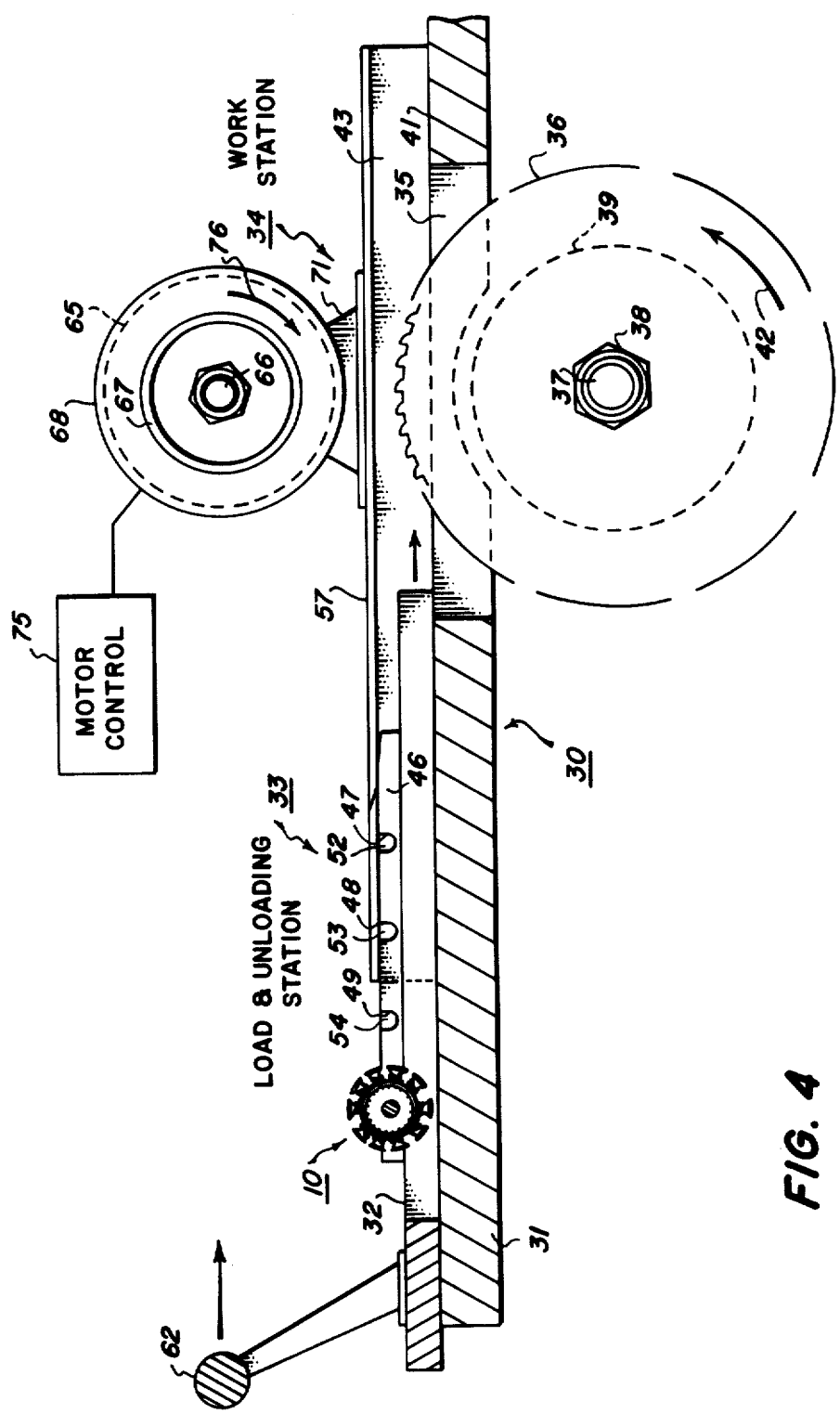
FIG. 4 is a side cross-sectional view of the apparatus in FIG. 3 taken along lines 4—4 of FIG. 3.

Referring to FIGS. 1 and 2, typical direct current electric motor armatures 10, 11 respectively, are shown. The armature 10 shown in FIG. 1 includes an armature shaft 12, a cylindrical commutator 13, having segments 14, a core 15 or skewed laminations 16 mounted on the shaft 12 and wire 17 wound in slots 18 of the core 15 in a predetermined order to form coils 19, as is well known to those skilled in the art.

The armature 11 shown in FIG. 2 is another typical direct current electric motor armature 11 that is mass produced for the automotive industry. The armature 11 differs from the armature 10 of FIG. 1 in that the commutator 21 is of the flat disk type rather than the cylindrical commutator 13 of FIG. 1. Further, the core 22 of the armature 11 includes the laminations 23 which are fixed in a straight alignment and are not skewed as in the armature 10 of FIG. 1. The armature 11 also includes wire 24 wound in slots 25 of the core 22 to form coils 26 in a well known arrangement to those skilled in the art. The armature 11 includes shaft 27.

The armatures 10, 11 are typical of the electric motor armatures that are mass produced in very high volume in the automotive industry. As will be seen hereinafter, the wire 17 of armature 10 will be cut along broken line 9 in order to strip the wire 17 from the armature 10. It should be understood that other armatures not shown, may be stripped in accordance with the present invention.

Referring now to FIGS. 3–7, an apparatus 30 in accordance with a preferred embodiment of the invention is shown for stripping various electric motor armatures such as armatures 10 and 11 of FIGS. 1 and 2. The apparatus 30 includes a frame 31 and an armature carrier 32 for carrying one or more armatures 10 in a side-by-side relationship between a loading and unloading station 33 (FIG. 4) and a work station 34 (FIG. 5) of the apparatus 30. The frame 31 includes a reference surface 41 and an opening 35 at work station 34 for a circular saw 36 mounted on a shaft 37 and secured thereto by a nut 38. The saw 36 is driven by an electric motor 39 in a counter-clockwise direction as indicated by the arrow 42 in FIGS. 4–7. The motor 39 and saw 36 may be raised or lowered with respect to the reference surface 41 by adjusting screws 40.

The carrier 32 is manually slideable along the reference surface 41 of the frame and is guided laterally by left and right guide way members 42, 43 for travel between the loading and unloading station 33 and the work station 34. The left and right guide way members 42, 43 are fixed to surface 41 of the frame 31. The carrier 32 includes a pair of armature shaft bearing support members 45, 46 for cradling or supporting a plurality of armatures 10 in a side-by-side relationship in open bearing slots 47, 48, 49, 51 in support member 45, and a corresponding plurality of diametrically opposed bearing slots 47, 48, 49, 51 in bearing support member 46 for supporting the armature 10 on the shaft 12. The armature 10 is desirably supported on its shaft 12 in a similar manner to the normal operating condition within an electric motor (not shown). The bearing slots 47, 48, 49, 51 of the bearing support members 45, 46 are adapted to rotatably support the armature 10 by the shaft 12. The depth of the bearing slots is equal to the diameter of the shaft 12 with the bottom of the slots being rounded and also having the same diameter as the shaft 12. The bearing support member 45, 46 include end walls 52, 53, 54, 55 in bearing slots 47, 48, 49, 51 respectively. The end walls 52, 53, 54, 55 longitudinally restrict the end play of the armature shaft 12. The shaft 12 conveniently has a shaft end 8 of reduced diameter which provides for placing of the armature 10 in only one way and therefore the bearing support member 46 and the associated slot 47, 48, 49, 51 also include an additional slotted recess 56 to receive the shaft end 8 of shaft 12. The advantage of this armature orientation is that the circular saw 36 is in alignment with the armature 12 in the plane of the dotted line 9 (FIG. 1) between the commutator 13 and the core 15 for cutting the wire 17 as will be described hereinafter. The armatures 10 are loaded and unloaded onto the carrier 32 at the loading and unloading station 33 by merely placing the armatures 10 into the open bearing slots 47, 48, 49, 51 of the bearing support members 45, 46 in proper orientation as aforesaid.

The carrier 32 and each of the armatures 10 placed in the open slot 47, 48, 49, 51 is secured to the frame 31 and reference surface 41 by upper left and right retainer guides 57, 58 fixed to the left and right guide way members 42, 43 which form the guide means 60 for guiding the carrier 32 and armature 10 between the loading and unloading station 33 and work station 34. As can now be seen, the armature 10 can be manually transported between the loading and unloading station 33 and the work station 34. The armatures 10 are rotatable and secured to the carrier 32 in the work station 34 by the guide means 60 and the carrier 32. A handle 62 is fixed to the carrier 32 for manually moving the carrier 32 between the loading and unloading station 33 and work station 34. The carrier 32 has a clearance opening 63 for straddling the circular saw 36.

The apparatus 30 includes a drive means 64 for rotating the armature 10 at the work station 34. The drive means 64 includes a motor 65 having a shaft 66 and a drive wheel 67 mounted on the shaft 66, and a friction tire 68 mounted on a drive wheel 67. The friction tire 68 ideally is a rubber tire 68 which coacts with the core 15 of the armature 10 to rotate the armature 10 during contact. The drive wheel 67 is secured to the shaft 66 by a retaining nut 69. The drive means 64 includes a motor frame 71 which includes spring members 72 and limiting studs 73 which together with the springs 72 provide a limited elevational movement for the drive wheel 67. The motor 65 is under the control of a motor control 75 so that various rotational speeds may be selected for different size armatures 10. Ideally, the drive wheel 68 is in contact with the core 15 of the armature 10 and causes the armature 10 to rotate at about the same time the carrier 32 moves the armature 10 into the circular saw 36 causing the simultaneously cutting of wire 17 between the commutator 13 and the core 15 and rotation of the armature 10 by the drive wheel 67.

Figure 7:
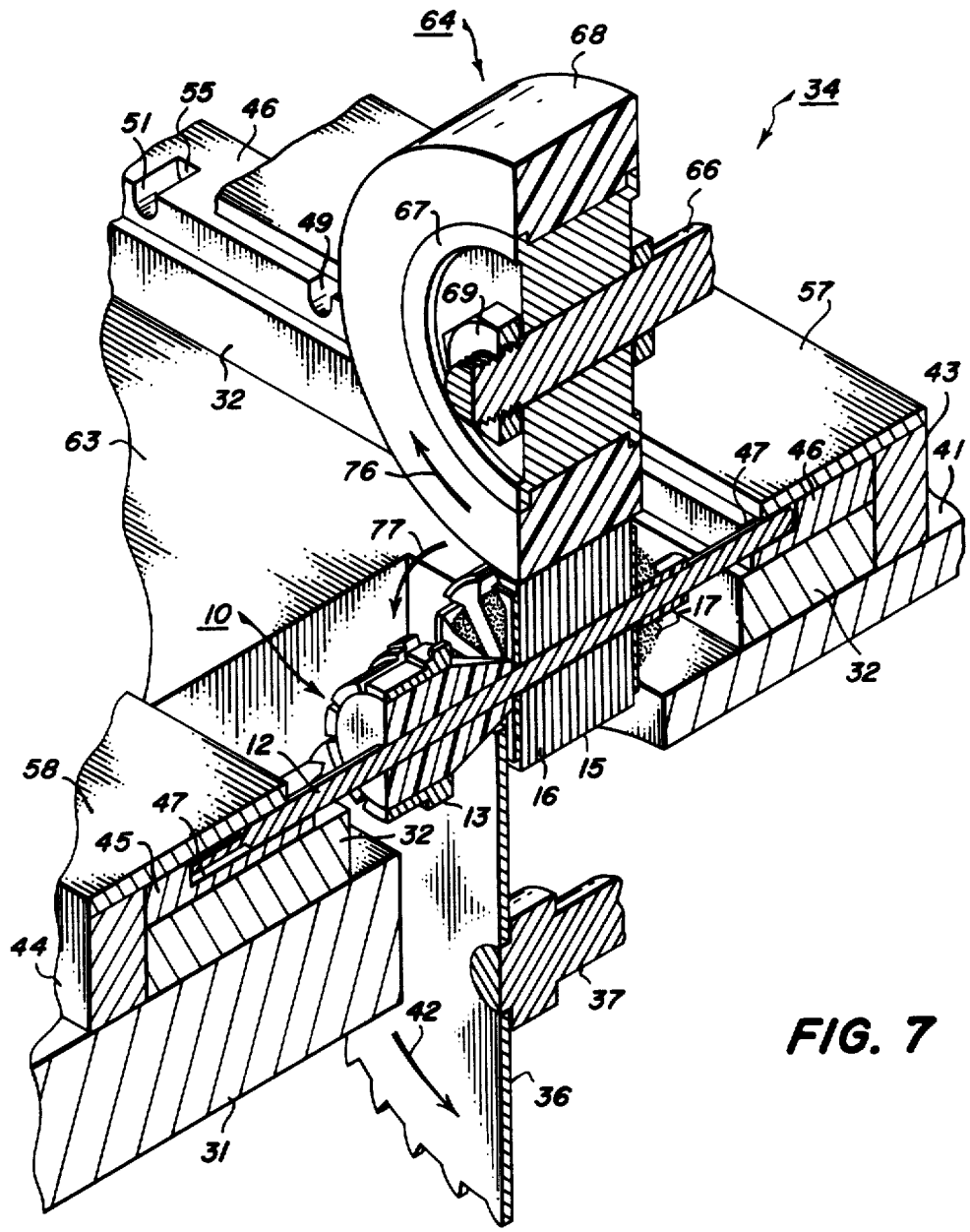
FIG. 7 is a fragmentary perspective view of the apparatus taken along lines 7—7 of FIG. 5.

FIG. 7 best illustrates the action that takes place at the work station 34. As is seen in FIG. 7, the drive wheel 67 and the tire 68 rotate in a clockwise direction as indicated by arrow 76 and rotate the armature 10 in a counter-clockwise direction as indicated by the arrow 76. The armature 10 rotates on the bearing support members 45, 46 while the circular saw 36 cuts the wire 17 of the armature 10 between the commutator 13 and the core 15. It should be noted that at the peak of the cutting action within the work station 34, the shaft 66 of the drive wheel 67, the shaft 12 of the armature 10 and the shaft 37 of the saw motor 39 are in alignment with each other. At this alignment, the circular saw 36 cuts to a maximum depth into the wire 17 of the armature 10 and the rotation of the armature 10 by the drive means 64 insures that this depth of cut into the wire 17 is uniformly maintained throughout the circumference of the armature 10 between the commutator 13 and the core 15. The cutting of the wires 17 is continued as the carrier 32 is moved past the work station 34 until all of the armatures 10 transported by the carrier 32 are sequentially cut by the circular saw 36 in the similar manner as each armature 10 passes through the work station 34. When the last armature 10 on the carrier 32 passes the work station 34, the carrier 32 is returned to the loading and unloading station 33 where the armatures 10 are unloaded from the carrier 32 and the wire 17 is easily pulled from the slots 18 of the core 15 away from the commutator 13. A new series of armatures 10 may be loaded on the carrier 32 as aforesaid and the process may be repeated to cut the wire 17 on the armature 10.

Figures 5, 6:
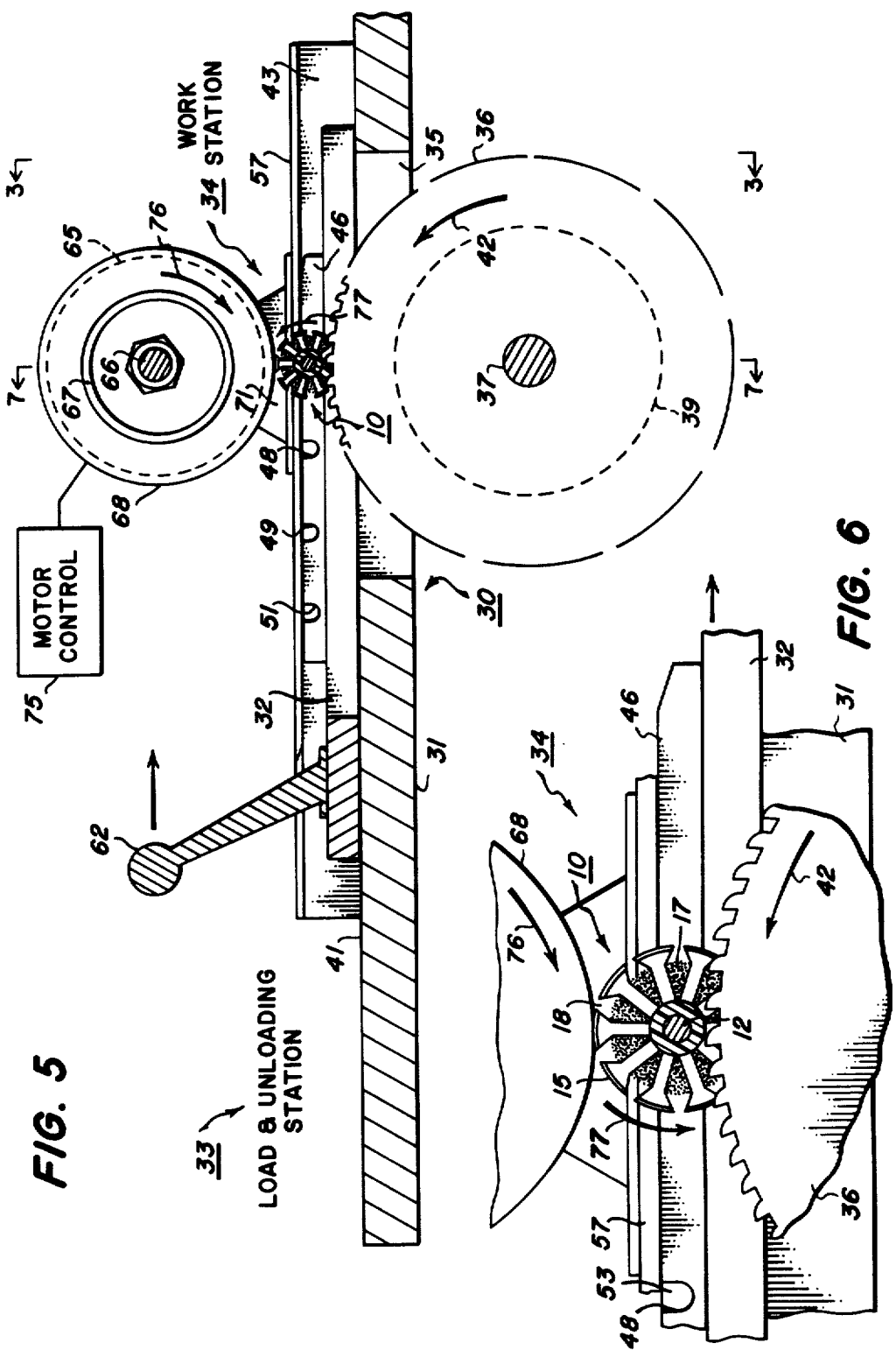
FIG. 5 is a cross-sectional view of the apparatus taken along lines 5—5 of FIG. 3.
FIG. 6 is a partial enlarged view of the apparatus of FIG. 5.

Referring now to FIGS. 5, 6, the apparatus 30 holds the armature 10 while the armature 10 passes over the circular saw 36 and under the drive wheel 67 and tire 68 in the travel of the armature 10 through the work station 34. The armature 10 is held to the carrier 32 by the left retainer guide 57 so that the armature 10 may still rotate on carrier 32 while the drive wheel 67 and tire 68 rotate the armature 10 into the rotating circular saw 36 in a counter direction simultaneously to the cutting of the wire 17 of the armature 10.

In the operation of the apparatus 30, the armature 10 are loaded on the carrier 32 at the loading and unloading station 34 by placing the armature 10 in the open slots 47, 48, 49, 51 of the bearing support members 45, 46. The carrier 32 and armatures 10 cradled and supported on the carrier 32 are manually moved towards the work station 34. The guide means 60 not only guides the carrier 32 into the work station 34 but locks the carrier 32 and the armatures 10 to the frame 31 so that the armatures 10 will remain on the carrier 32 and in turn the carrier 32 is slideably locked to the surface 41 of the frame 31. As each armature 10 comes in contact with the drive means 64, the drive wheel 67 rotates the armature 10 on the armature shaft 12 just prior to the circular saw 36 coming in contact with the wire 17 disposed between the commutator 13 and the core 15. The drive means 64 not only rotates the armature 10 but also imparts sufficient torque to the armature 10 so that the circular saw 36 may cut the wire 17. It should be noted that if the armature 10 is not rotated in the work station 34, the circular saw will merely cut a slot through the wire 17 of the armature 10 at a given depth. Thus, by rotating the armature 10 by the drive means 64, the wire 17 is cut in the aforesaid depth circumferentially about the shaft 12. As each armature 10 is transported through the work station 34, the armature 10 is rotated by the drive means 64 and cut by the circular saw 36. The carrier 32 is then manually returned to the loading and unloading station 33. In the return cycle, each armature 10 is again rotated by the drive means 64 and the circular saw 36. When the carrier 32 is in the loading and unloading station 33, the armatures 10 are removed from the carrier 32 and the cut wire 17 is pulled from the armature 10 in the direction away from the commutator 13.

The preferred method of stripping the armature 10 in accordance with the preferred embodiment of the invention includes the steps of cutting the wire 17 between the core 15 and commutator 13 a given depth with a rotating circular saw 36 and simultaneously rotating the armature 10 for at least one complete revolution while the circular saw 36 is cutting the wire 17 at the aforesaid depth to insure the complete cutting of the wire 17 circumferentially on the armature 10. Once the wire 17 is cut circumferentially, the wire 17 is easily pulled from the armature 10 in a direction away from the commutator 13.

While the present invention has been illustrated for use with armature 10, it should be understood that other armatures such as armature 11 may be stripped in accordance with the present invention.

Modifications and alterations may occur to those skilled in the art, for example, the carrier 32 which is manually slideable between the loading and unloading station 33 and work station 34 may be power driven instead of manually driven. Further, a plurality of carriers 32 may be employed in the present invention, all of which carriers 32 may be connected in an endless belt (not shown) to continuously transport the armatures 10 from the loading and unloading station 33 in a path (not shown) between the drive wheel 67 and the circular saw 36 at the work station 34.

Other modifications may for example feature a drum type carrier (not shown) instead of the carrier 32. The drum carrier (not shown) would include the bearing slots 49 for placing the armature shaft 12 of the armature 10 on the drum carrier (not shown) so that the armatures 10 may be carried on the outside of the drum carrier (not shown), and yet be locked in place by arcuate retainer guides (not shown) similar to the left and right retainer guides 57, 58 respectively, only curved to match the curved surface of the drum. The retainer guides (not shown) would retain the armature 10 against the drum and still permit the armature 10 to rotate on its shaft 12. The drum carrier (not shown) is adapted to carry the armature 10 from a loading station 33 to a work station 34 wherein the drive wheel 67 rotates the armature 10 while the circular saw 36 cuts the wire 17 on the armature 10. Again, in accordance with the present invention, when the armature shaft 12, the saw shaft 37 and the drive wheel shaft 66 are in alignment with each other as shown in FIG. 7, the wire 17 of the armature 10 is cut to the desired depth so that all of the wires 17 may be removed later from the armature 10.

While the present invention has been described for use in stripping armatures 10, 11 such as the type shown in FIGS. 10, 11, it should be understood that the present invention may also be used in the stripping of electrical stators (not shown) by cutting a field winding (not shown) with the circular saw 36 while rotating the stator (not shown) by means of the frictional drive wheel 67. In accordance with the invention, the stator (not shown) is rotated on a modified carrier 32 by the drive wheel 67 which is in contact with the peripheral surface of the stator (not shown).

Having thus described the invention, it will be evident that other modifications and improvements may be made by one skilled in the art which would come within the scope of the annexed claims.

What is claimed as new and desired to be secured by Letters Patent of the United States is:

1. A method of stripping wire from an armature having a core and a commutator fixed to an armature shaft, said wire being wound on said core and connected to said commutator, the step comprising:
    (a) mounting said armature rotatably on a moveable carrier,
    (b) moving said carrier and said rotatable armature thereon across a circular saw rotating in a given rotational direction,
    (c) cutting said wound wire on said armature by said rotating circular saw in a plane disposed between said core and said commutator and normal to said shaft of said armature, and
    (d) rotating said armature with a rotating frictional drive wheel in a rotational direction counter to said given rotational direction of said rotating saw and simultaneously with said cutting of said wire in said plane.

2. An apparatus for stripping wire from an armature having a core and a commutator fixed to an armature shaft, said wire being wound on said core and connected to said commutator, said apparatus comprising:
    (a) a frame,
    (b) a circular saw means including a rotating circular saw mounted on said frame for cutting said wound wire on said armature, (i) said circular saw being rotated in a given rotational direction, (c) drive means including a rotating wheel yieldingly mounted on said frame and diametrically opposed to said rotating circular saw for rotating said armature in a rotational direction counter to said given rotational direction of said circular saw with sufficient torque for simultaneously cutting said wound wire by said rotating circular saw, (i) said drive means includes spring means for spring biasing said rotating wheel against said armature just prior to and during said cutting of said wound wire on said armature, (d) carrier means for sequentially moving a plurality of said armatures in a side by side relationship between said rotating circular saw and said rotating wheel, (i) said carrier means includes bearing support means for individually supporting each of said plurality of armatures for rotation on said carrier, and (e) guide means fixed to said frame for guiding said carrier means in cooperative relationship with said rotating saw and said rotating wheel for sequentially rotating and cutting said wound wire of each of said armatures by said rotating saw in a plane disposed between each of said cores and each of said commutators and normal to each of said armature shafts of said armatures.

3. Apparatus for stripping wire from an armature having a core and a commutator fixed to an armature shaft having a given diameter, said wire being wound on said core and connected to said commutator, said apparatus comprising:

(a) a frame having a loading and unloading station and a work station for said armature, (i) said frame having a horizontal reference surface, (b) an armature carrier means for horizontally and rotatably carrying said armature thereon, (i) said armature carrier means includes bearing support members having a top surface and open bearing slots in said top surface for rotatably supporting said armature on said shaft of said armature, (ii) said open bearing slots of said bearing support members having a depth and width substantially equal to said diameter of said shaft, (iii) said armature carrier means being slideable on said horizontal reference surface of said frame, (c) guide means for guiding said armature carrier means between said loading and unloading station and said work station of said frame, (i) said guide means include a pair of lateral guide way members fixed to said horizontal reference surface of said frame for guiding said carrier means between said loading and unloading station and said work station on said horizontal reference surface of said frame, (ii) said guide means includes upper retainer guides disposed in said work station above said horizontal reference surface of said frame and coacting with said carrier means for vertically retaining said carrier means and said rotatable armature to said reference surface of said frame, (d) circular saw means including a rotating circular saw fixed to said frame at said work station in cooperative relationship with said carrier means and said guide means for cutting said wound wire on said armature in a plane disposed between said commutator and said core and normal to said shaft of said armature, (i) said rotating saw rotates in a given rotational direction, and (e) drive means including a spring biased drive wheel disposed in said work station of said frame for simultaneously rotating said armature in a rotational direction counter to said given rotational direction of said circular saw with sufficient torque for cutting of said wound wire by said rotating circular saw.

4. In an armature stripping machine for stripping wire from an armature having a core and a commutator fixed to a shaft, said wire being wound on said core and connected to said commutator, the combination comprising, (a) a frame having a loading and unloading station and a work station, (b) a circular saw means including a stationary rotating circular saw fixed to said frame in said work station for cutting said wire of said armature, (i) said rotating circular saw being rotated in a given rotational direction, (c) carrier means moveable on said frame through said loading and unloading station and said work station for transporting said armature across said rotating circular saw to cut said wire wound on said armature in a plane disposed between said commutator and said core and normal to said shaft, (i) said carrier means includes bearing means for rotatably supporting said armature on said carrier means, (d) drive means including a spring biased rotating drive wheel yieldingly disposed diametrically across said rotating circular saw for rotating said armature on passage of said carrier means and said armature across said rotating saw, (i) said rotating drive wheel coacting with said armature to rotate said armature in a rotational direction counter to said given rotational direction of said circular saw and with sufficient torque to cut said wound wire disposed in said plane.

* * * * *